J. G. QUINBY.
ROTARY ENGINE.
APPLICATION FILED DEC. 1, 1909. RENEWED OCT. 2, 1912.
1,061,122.
Patented May 6, 1913.
5 SHEETS—SHEET 1.
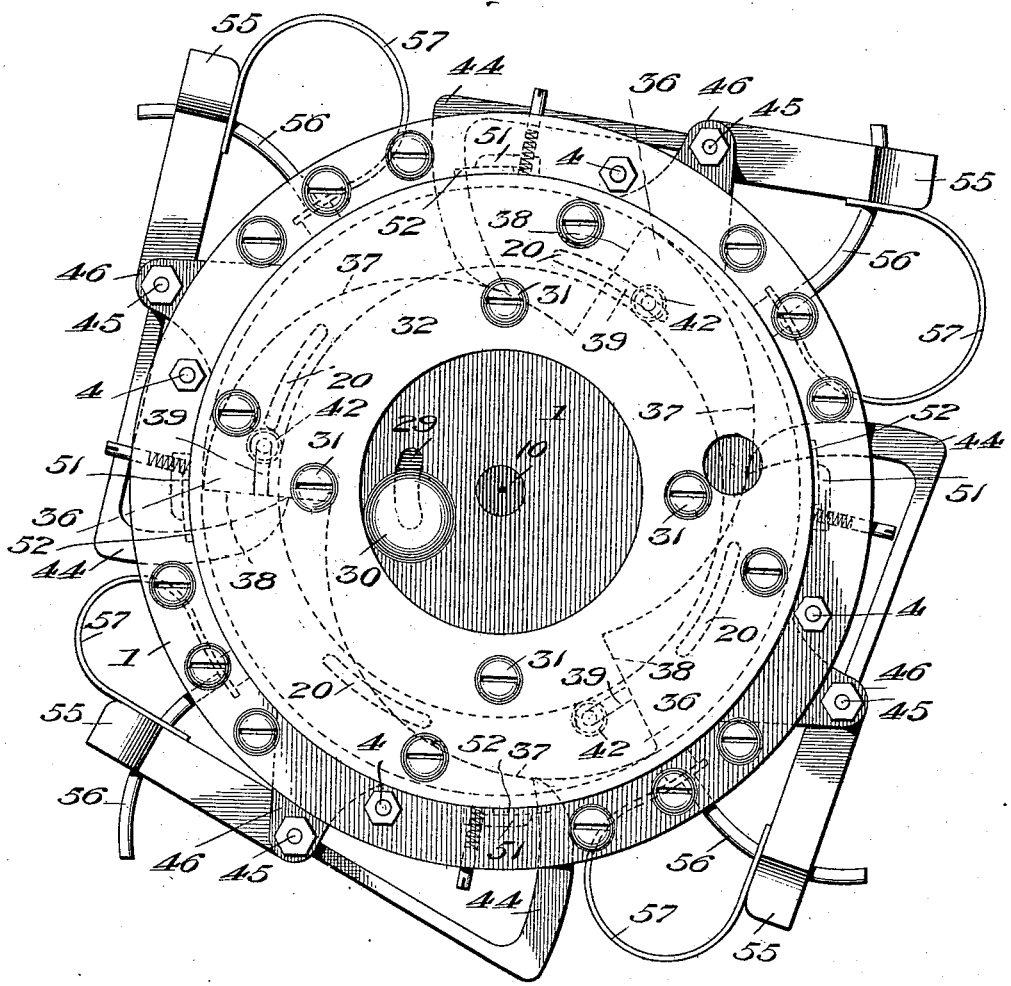
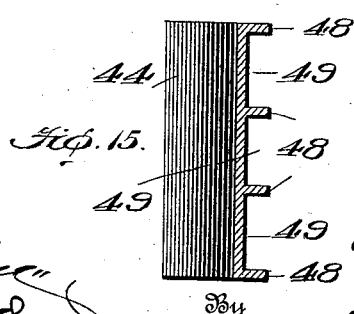
Witnesses
Inventor
John G. Quinby
By
His Attorney

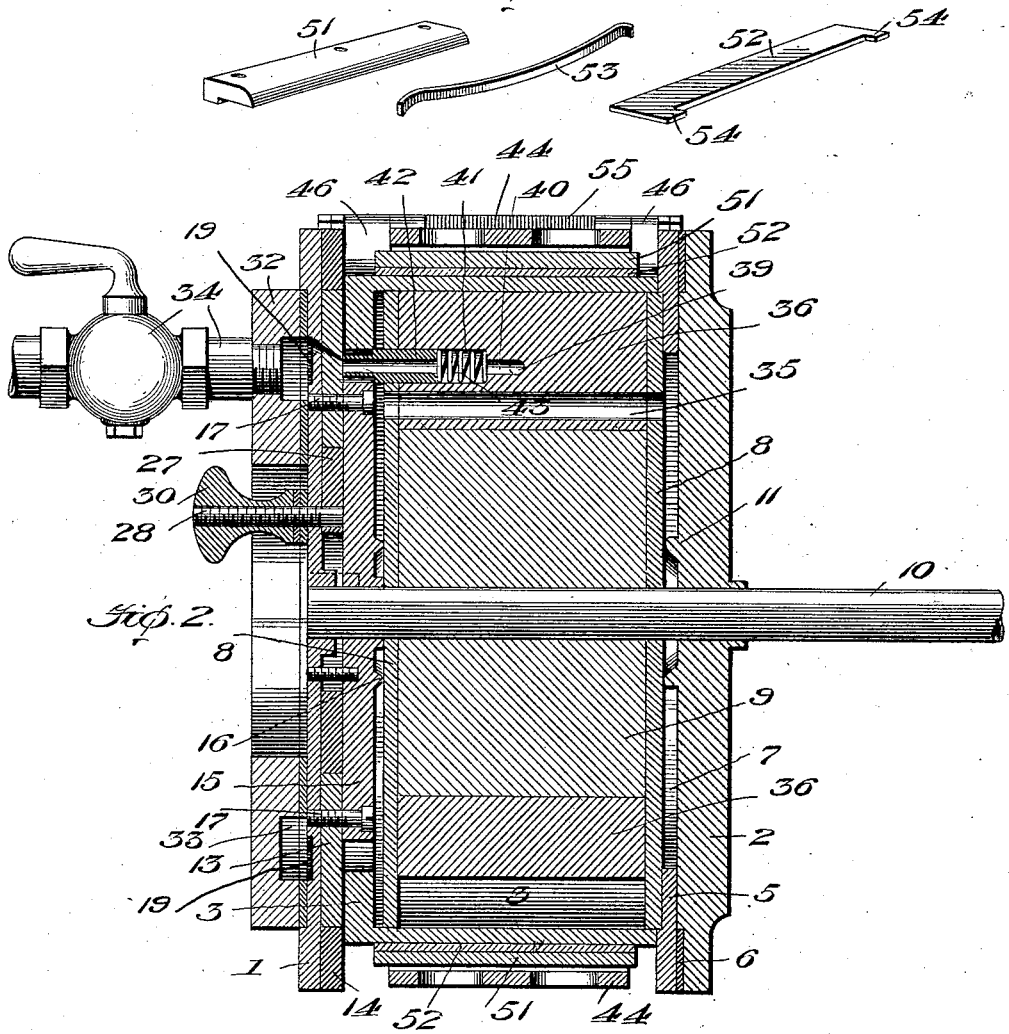

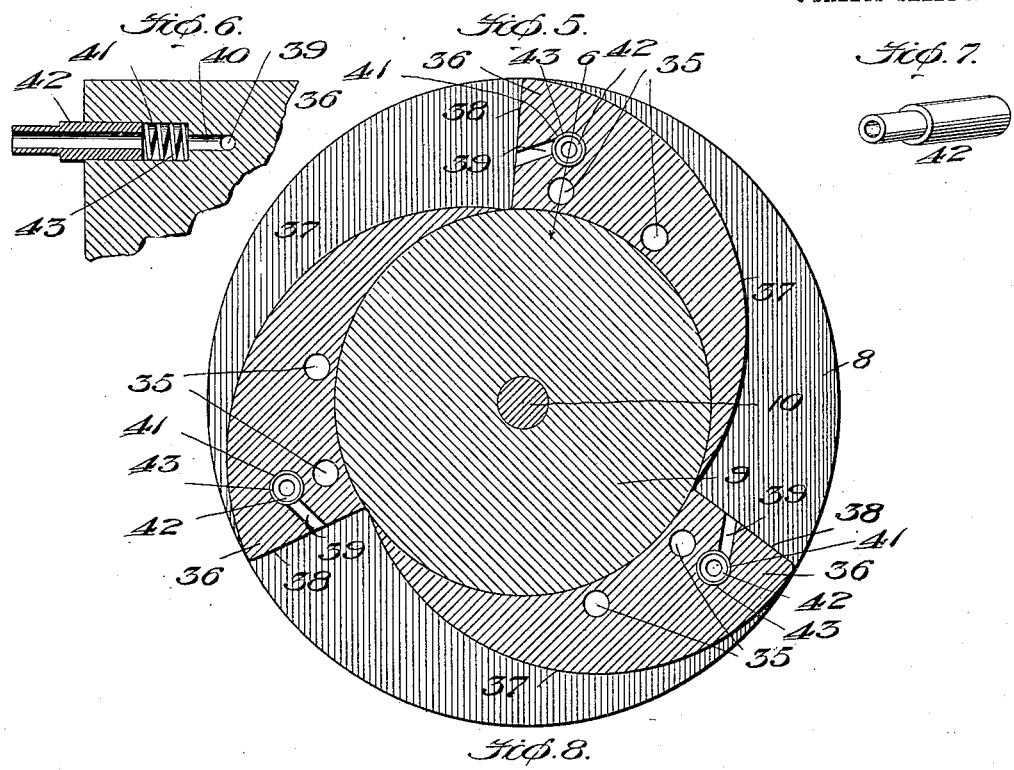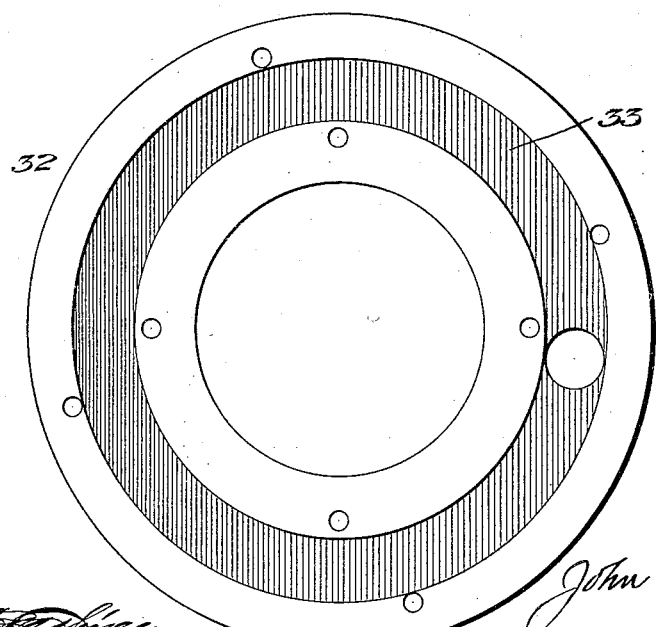

J. G. QUINBY.
ROTARY ENGINE.
APPLICATION FILED DEC. 1, 1909. RENEWED OCT. 2, 1912.

1,061,122.

Patented May 6, 1913.
5 SHEETS—SHEET 4.

Witnesses

Inventor
John G. Quinby
By
His Attorney

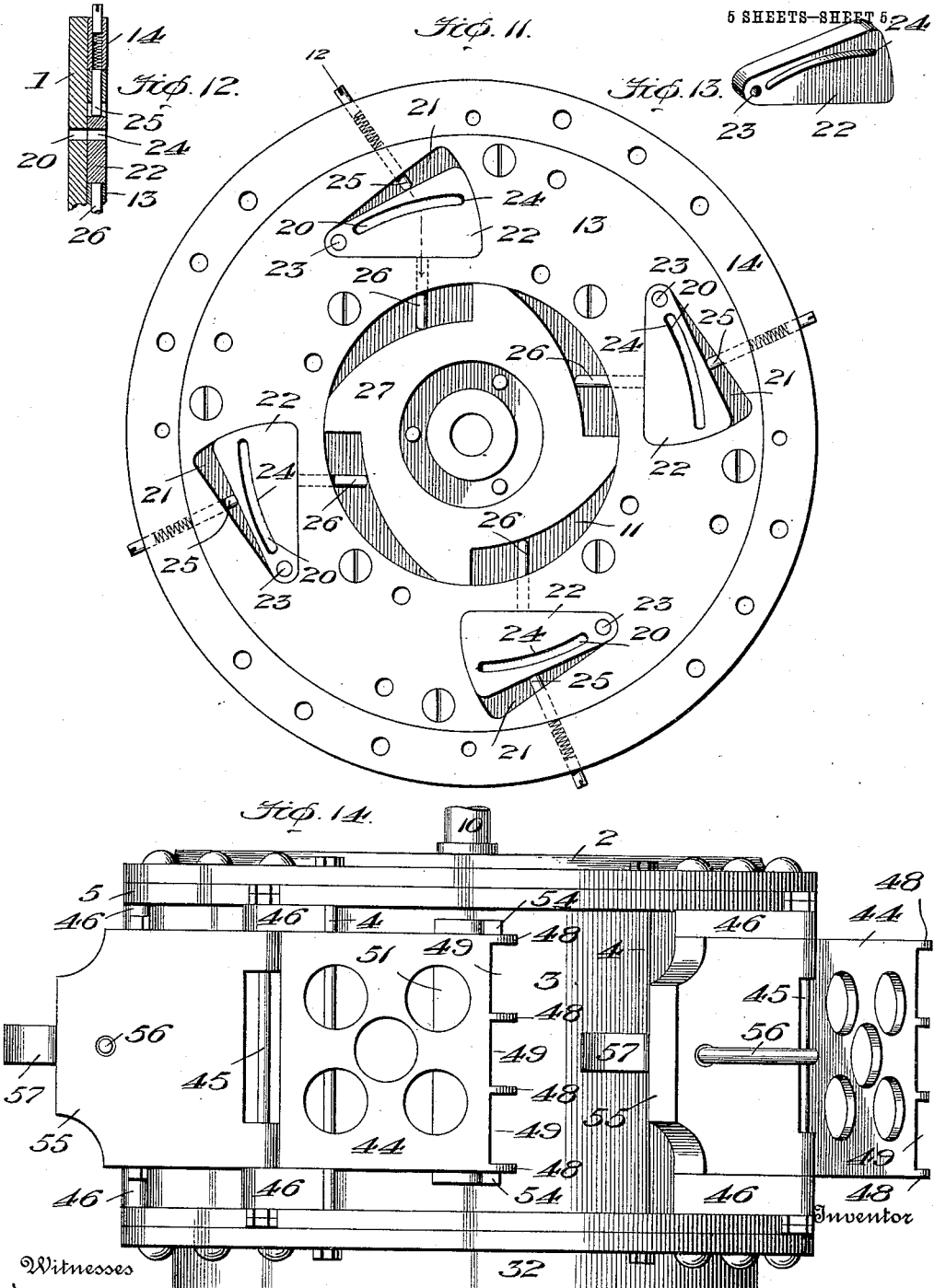

UNITED STATES PATENT OFFICE.

JOHN G. QUINBY, OF NORFOLK, VIRGINIA.

ROTARY ENGINE.

1,061,122.  Specification of Letters Patent.  Patented May 6, 1913.

Application filed December 1, 1909, Serial No. 530,853. Renewed October 2, 1912. Serial No. 723,590.

*To all whom it may concern:*

Be it known that I, JOHN G. QUINBY, United States Navy, a citizen of the United States, at present residing at Norfolk, county of Norfolk, and State of Virginia, have invented certain new and useful Improvements in Expansive-Motive-Fluid-Operated Rotary Engines, of which the following is a specification.

My invention relates to expansive motive fluid operated rotary engine.

The present invention has for its object the provision of a rotary engine adapted for operation by steam, air, gasolene, and liquid air pressure, although especially designed for operation by compressed air, which will be of novel construction, of high efficiency, compact, having no dead centers, easily regulable, adapted to operate with but little noise and slight friction, and strong and durable.

Figure 9:
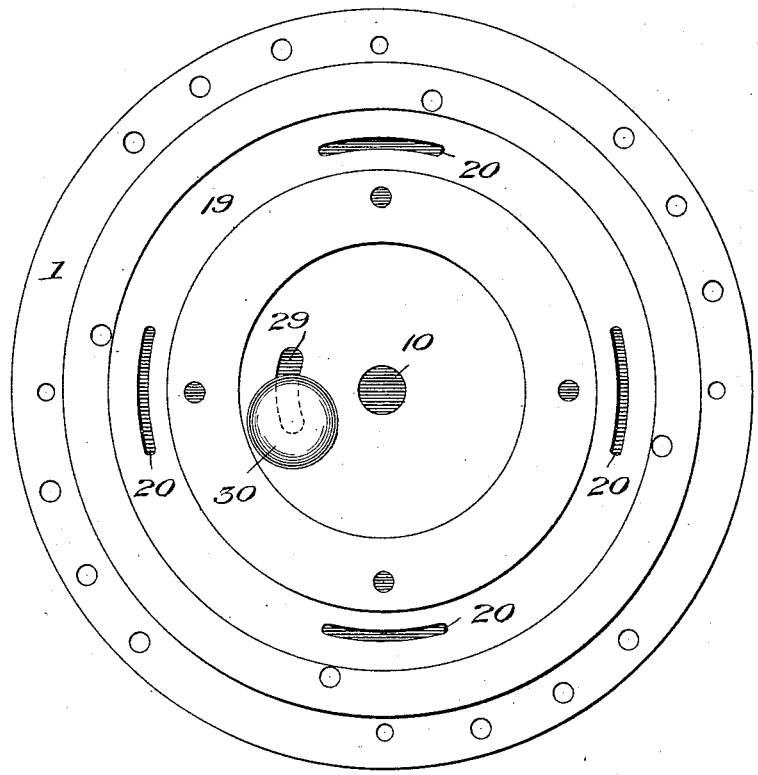
Figure 10:
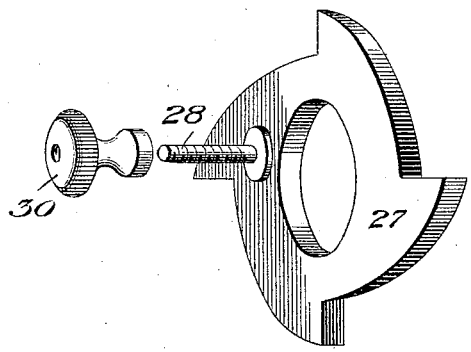

In the accompanying drawings:—Figure 1 is a side elevation, dotted lines representing the piston or rotator, the motive fluid admission controlling devices, and other parts; Fig. 2, a cross-section; Fig. 3, details of the parts constituting the packing for the abutments; Fig. 4, a longitudinal detail section through an abutment and its packing; Fig. 5, a vertical section through the piston or rotator; Fig. 6, a detail on line 6 of Fig. 5; Fig. 7, a detail perspective of one of the air inlet tubes; Fig. 8, an interior face view of the casing face plate through which the expansive motive fluid is admitted and distributed by the annular recess therein; Fig. 9, a view of the outer face of the casing head showing the slots to which the expansive motive fluid is admitted from the annular channel of the face plate of Fig. 8; Fig. 10, a detail of the star cam and its handle, shown detached, for operating the members which control the air inlet slots; Fig. 11, a view of the reverse side of the casing head of Fig. 9, showing the star cam and the controlling members for the slots, the covering plate for the star cam being omitted; Fig. 12, a detail section on line 12 of Fig. 11 illustrating how the controlling members are operated; Fig. 13, a detail of one of the controlling members; Fig. 14, a plan view of the complete turbine; and Fig. 15, a cross-section of one of the abutments, showing the exhaust channels.

The casing is composed of heads 1 and 2 and a hollow shell 3, held together by tie bolts 4 extending outside of the shell 3. The head 2 carries on its inner face a ring 5, suitable packing 6 being employed. This ring circumscribes the motive fluid space 7 located between the head 2 and one of the side plates 8 of the piston 9 which is carried by shaft 10, the latter being journaled in the heads 1 and 2. Integral with the head 2 is an annulus 11 which bears against the plate 8 of the rotator. The head 1 carries on its inner face the plate 13 and ring 14 and the bearing plate 15 which has an annular ring 16 like ring 11, bearing against the side plate 8 of the piston. The screws 17 secure these parts together.

The head 1 is provided with an annular channel 19 (Fig. 9). Extending through the head 1 where the channel 19 is located are arc-shaped slots 20 which are disposed, in the present instance, at 90° apart, but the number of slots vary and are always equal to the number of co-acting abutments.

There are sector-shaped openings 21 extending through the plate 13 and corresponding in number with the slots 20, and pivoted in these openings at 23 are the sector-shaped valves 22 which are provided with arc-shaped slots 24 which are in alinement with the slots 20 when the said valves 22 are in the position shown in Fig. 11, said valves being somewhat narrower than the openings 21 so that they may play back and forth therein. The valves are designed to be held in the position shown in Fig. 11 by spring-actuated plungers 25, but there are provided pins 26 adapted to coöperate with the other sides of the valves which are in turn simultaneously operated by a star cam 27 (Figs. 10 and 11) which is adapted to be rotated from the exterior of the rotary engine by the screw-threaded stem 28 secured thereto and extending through slot 29 (Fig. 1) and the knob 30 on said stem which is adapted to be clamped against the head 1. Thus, on shifting the knob 30, the star cam 27 is turned and all of the pins 26 thereby push the valves 22 outwardly against the spring devices 25 and more or less, according to the movement of the knob 30, throw the slots 24 out of register with the slots 20 (Fig. 12), and thus the admission of the motive fluid pressure through the slots 20 is controlled and may be maintained by clamping the knob 30 against the head 1 and I thereby regulate the quantity of motive fluid pressure which is admitted to the piston, as will more fully appear hereinafter.

Secured to the head 1 by fastenings 31 is the face plate 32 (Figs. 1, 2 and 8) which has on its inner face an annular channel 33 to which the motive fluid pressure is admitted in any suitable way, as by a pipe controlled by a valve 34 when air pressure is used. When an explosive gasolene mixture is used, a suitable charge forming and exploding device will be utilized for directing the exploded charge into the channel 33. The channel 33 faces the slots 20 (Fig. 9) and hence all of said slots are in position to receive the motive fluid pressure, but the entry of the motive fluid to the piston is controlled by the valves 22 as heretofore set forth.

The piston 9 is provided with openings or ports 35 extending transversely therethrough and through the side plates 8 thereof so that the air or other pressure is admitted to both sides of the piston and hence the piston is balanced within its shell or case. The piston is provided with a plurality of vanes 36 which are one less in number than the number of the ports or slots 20, and said vanes are provided with gradually curving or rounded cam faces 37 disposed between the side plates 8 and extending from the inner part 9 of the piston outward until they merge in the peripheries of the side plates 8. Each vane 36 has a face or shoulder 38 which is disposed off of a radius of the piston so that there will be no impactive action of the abutments described later. The faces or shoulders 38 extend from the peripheries of the side plates 8 to the points where the cam surfaces 37 merge in the body 9 so that the abutments will immediately engage a succeeding cam after they have passed off of the one previously engaged. Opening out through the faces 38 are discharge ports 39 which are so disposed that they will discharge the air or other motive fluid in a direction normal to the faces of the abutments, and these ports communicate with channels or ports 40 which extend transversely of the piston (Fig. 2) and open into sockets 41 which contain slidable intake tubes 42 (Figs. 2, 6 and 7) which are seated on springs 43 that throw them outwardly so that they constantly bear against the inner face of the head 13. The intake tubes 42 are disposed so that they travel in the circle of the slots 20 and 24 and consequently they are adapted to receive the motive fluid which passes through the said slots and, it will be observed, these intake tubes will receive more or less of the motive fluid, according to whether the valves 22 are in their innermost position or are moved outwardly, as by the positioning of these valves 22 the intake to the piston and the rapidity of its revolution and the power obtained thereby are controlled.

Referring to Fig. 1, it will be observed that one of the intake tubes 42 is always in position to receive motive fluid pressure from some one of the slots 24, and if the valves 22 are in position to admit any motive fluid pressure whatever, the piston will start without any extraneous initial impulse, thus doing away with all dead centers.

The abutments which receive the motive fluid are most clearly shown in Figs. 1, 4 and 14, said abutments being greater in number, by one, than the vanes 36 so that one of said abutments will always be in position to receive motive fluid pressure from some one of the discharge ports 39. The abutments 44, which are pivoted on cross-rods 45 to ears 46 on the shell 3, are curved on their faces 47 where they receive the impact of the motive fluid on an arc of a circle struck from the pivots 45, and their opposite faces are provided with ribs 48 (Fig. 15) forming exhaust channels 49. The toes 50 are adapted to slide down the faces 38 of the vanes, and by reason of these faces being disposed off of a radius of the piston, while the inward movement of the abutment is very rapid, the toe 50 does not tend to so jump down and strike a blow on the succeeding cam surface 37 as would be the case if the faces were disposed radially. The abutments 44 are packed by the devices shown in Figs. 3 and 4 consisting of plates 51 secured to the shell 3 and packing strips 52 which are slidable under the plates 51 and pressed outwardly by springs 53. Lateral displacement of the packing strips 52 is prevented by the engagement of the lugs 54 with opposite edges of the abutments. The abutments are provided with counterbalancing tails 55 through which loosely pass arc-shaped members 56 secured to the case 3. Horse-shoe springs 57 whose ends straddle the members 56 act on the counterweighted parts 55 of the abutments and tend to force them inwardly. Other spring structures could be substituted for the foregoing, but I have found that horse-shoe springs are advantageous because their spring action is very rapid.

The initial inward movement of the abutments 44 after the toe 50 has passed off the cam 37 is very rapid and immediately the discharge port 39 is uncovered, further inward movement of the abutment is assisted by the access of pressure thereto which lessens its pressure on face 38. The movement is a very rapid sliding movement until the toe of the abutment strikes the cam, whereupon the abutment begins to ride on the latter. The pressure which acts on the face of the abutment is cut off after the toe has begun to ride on the cam on account of the passage of the given intake tube 42 beyond the end of the slot 24, whereupon the pressure is used expansively. Any pressure remaining in the space ahead of the abutment tends to exhaust through the channels 49.

In operation the expansive motive fluid pressure enters the channel 33 and is continuously accessible to the slots 20 from which it passes through the slots 24 according to the position of the valves 22 which are regulated by moving the knob 30. Passing from the slots 24, the pressure enters the intake tubes 42 as they come opposite said slots during the rotation of the piston. The pressure passes into the channels 40 and out through the discharge ports 39, but the parts are so timed that the intake tubes come opposite the slots only at about the time the abutments 44 have initially rapidly slid down the faces 38 so that thereupon the full pressure acts against the abutments 44 immediately the toes 50 have passed beyond the discharge openings 39, the pressure then assisting the inward movement of the abutment and for a period thereafter as the valve rides on the cam 37, the full active pressure is delivered to the abutment, but at a certain point the tubes 42 pass beyond the slots and the access of pressure to the abutment ceases but the pressure already received is used expansively. Any remaining pressure in front of the abutment tends to exhaust through the channels 49.

I wish it to be understood that the number of abutments 44 can be either less or greater than the number of vanes 36, that various modifications of structure may be resorted to in the controlling of the motive fluid pressure, the actuation of the abutments 44, and the intake devices and the invention may be modified in other respects and I do not, therefore, limit myself to the precise construction herein set forth.

Having thus described my invention, what I claim as new and desire to secure by Letters Patent, is:—

1. In an expansive motive fluid operated rotary engine, the combination with a casing, of a piston having a plurality of vanes, each provided with a cam and face or shoulder and with independent open conduits or ducts for the admission of the expansive motive fluid pressure, freely movable abutments adapted to ride on said cams and to receive the expansive motive fluid pressure issuing from the faces or shoulders of the pistons, said casing being provided with a plurality of open expansive motive fluid pressure admission ports having a common supply and adapted to direct the pressure to the independent admission means on the piston when said admission means come into register therewith, whereby the admission of the expansive motive fluid pressure to the vanes of the piston and the discharge therefrom is intermittent.

2. In an expansive motive fluid operated rotary engine, the combination with a casing, of a piston having a plurality of vanes, each provided with a cam and face or shoulder and with independent open conduits or ducts for the admission of the expansive motive fluid pressure, freely movable abutments adapted to ride on said cams and to receive the expansive motive fluid pressure issuing from the faces or shoulders of the pistons, said casing being provided with a plurality of open expansive motive fluid pressure admission ports having a common supply and adapted to direct the pressure to the independent admission means on the piston when said admission means come into register therewith, whereby the admission of the expansive motive fluid pressure to the vanes of the piston and the discharge therefrom is intermittent, and means for simultaneously regulating at will the admission of the motive fluid pressure to the open admission ports aforesaid.

3. In an expansive motive fluid operated rotary engine, the combination with a piston, and a casing, said piston having vanes provided with cams and faces or shoulders and with ports opening through the said faces or shoulders, of spring-actuated intake tubes on the piston for the admission of the expansive motive fluid pressure to the ports aforesaid, ports with which the intake tubes successively register during the relative rotation of the piston and casing, means for supplying expansive motive fluid pressure to the said admission ports aforesaid, abutments adapted to ride on said cams and to receive the expansive motive fluid pressure issuing from the ports in the shoulders, and means for exhausting the expansive motive fluid pressure.

4. In an expansive motive fluid operated rotary engine, the combination with a piston, and a casing, of abutments adapted to coact with the piston, a plurality of expansive motive fluid pressure admission slots adapted to direct the pressure to the piston, independent movable valves on the casing having slots adapted to be brought more or less into register with the slots aforesaid to regulate the volume of expansive pressure, and means for simultaneously moving said regulating valves.

5. In an expansive motive fluid operated rotary engine, the combination with a piston, and a casing, of abutments adapted to coact with the piston, a plurality of expansive motive fluid pressure admission slots adapted to direct the pressure to the piston, pivoted valves having slots adapted to be brought more or less into register with the slots aforesaid to regulate the volume of expansive pressure, a movable star cam adapted to simultaneously shift the regulating valves aforesaid, and means for turning said star cam.

In testimony whereof, I hereunto affix my signature in presence of two witnesses.

JOHN G. QUINBY.

Witnesses:
 IRVIN P. HOAG, Jr.,
 DAVID S. PHLEGAR.

Copies of this patent may be obtained for five cents each, by addressing the "Commissioner of Patents, Washington, D. C."